May 1, 1962 W. A. SEIFRIED 3,031,832
BEAN HARVESTER
Filed Nov. 17, 1959 3 Sheets-Sheet 1

William A. Seifried
INVENTOR.

BY *Clarence A. O'Brien*
*and Harvey B. Jacobson*
Attorneys

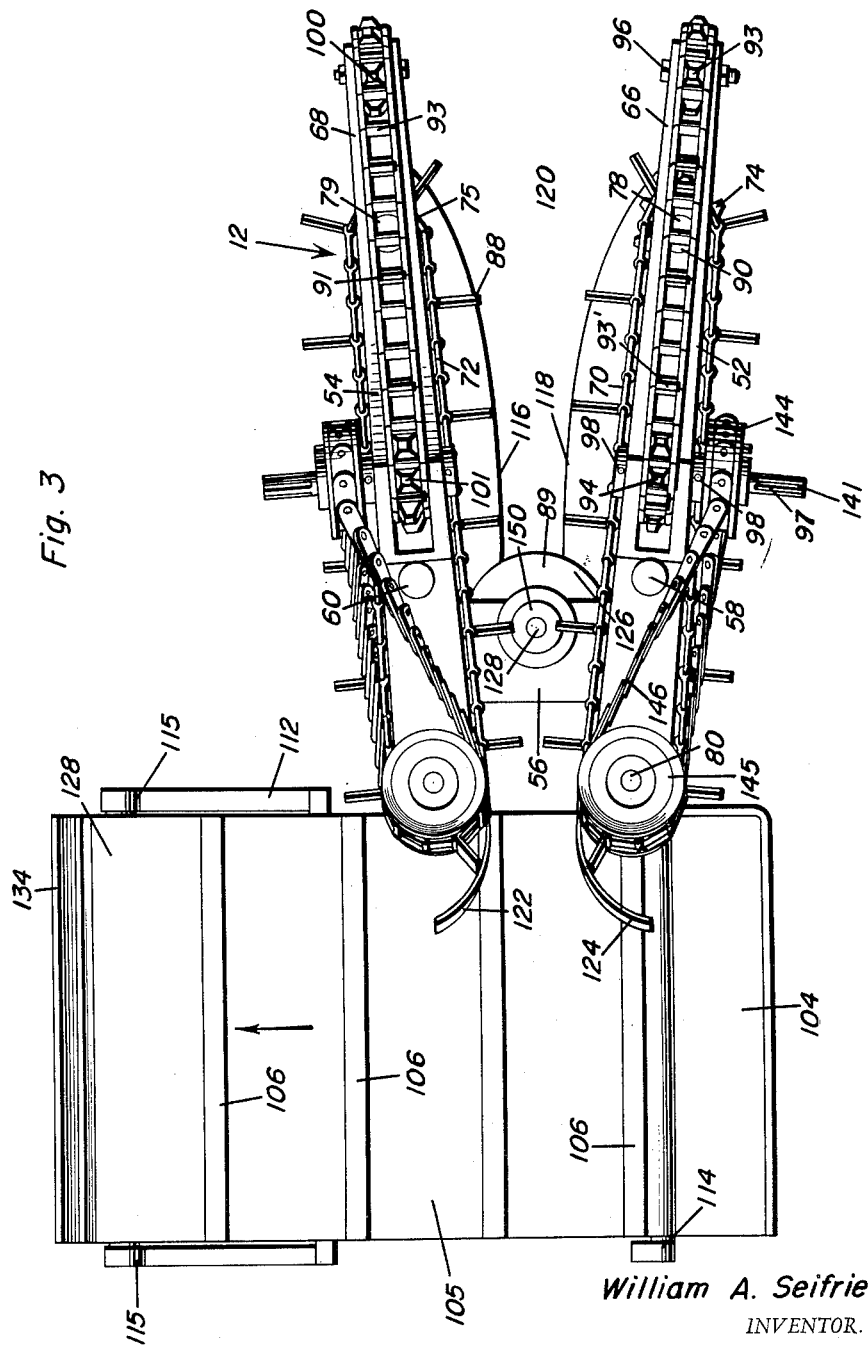

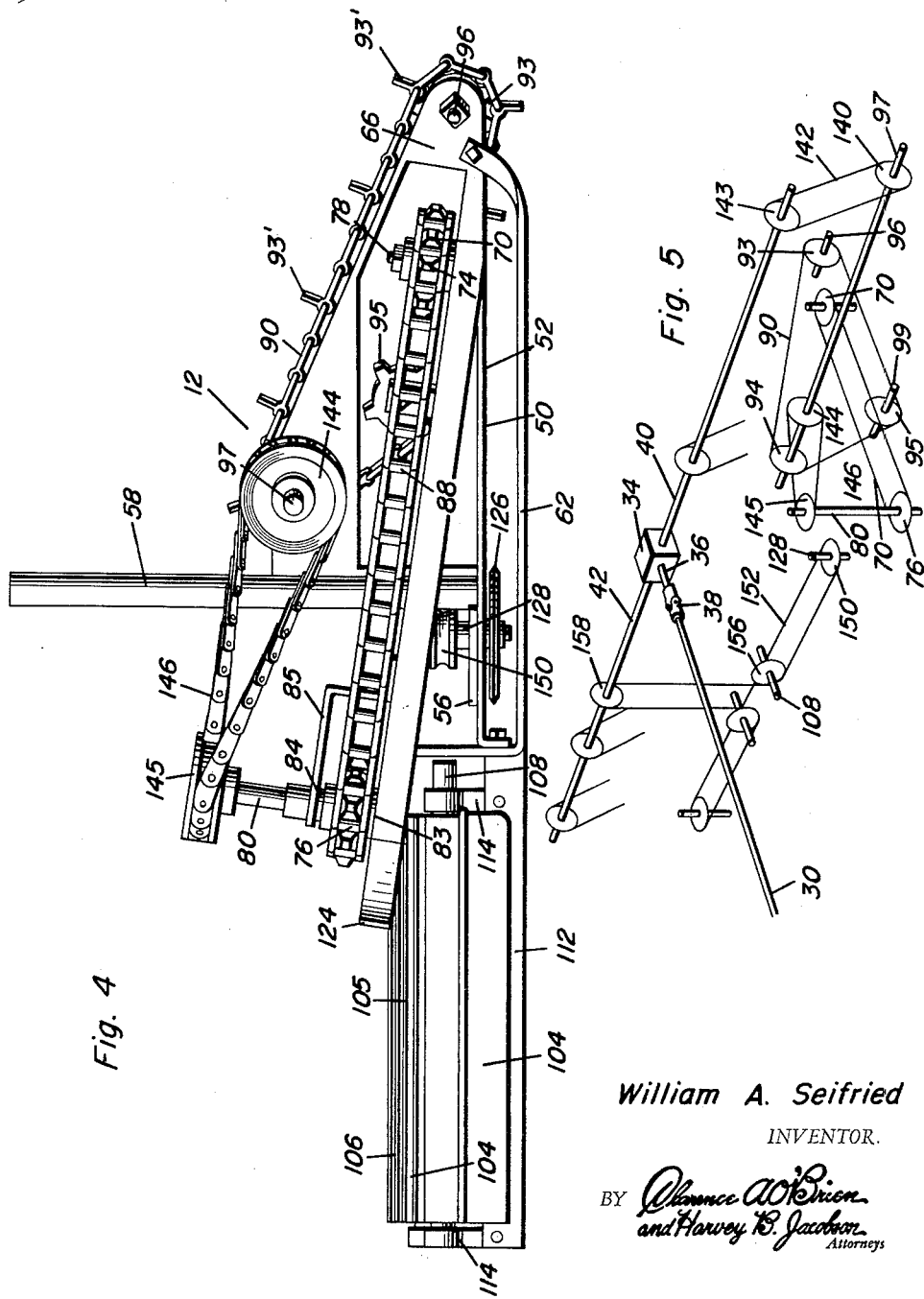

United States Patent Office 3,031,832
Patented May 1, 1962

3,031,832
BEAN HARVESTER
William A. Seifried, 2521 Alpha St., Lansing, Mich.
Filed Nov. 17, 1959, Ser. No. 853,565
15 Claims. (Cl. 56—192)

This invention relates to harvesters and more particularly to a harvester adapted to be mounted on a traction vehicle for harvesting bean crops.

An object of the invention is to provide a harvester capable of being used as a single row bean harvester or a plural row bean harvester.

Briefly, the harvester is made of a frame which has two conveyors alongside of each other and operating so that adjacent runs or flights of the conveyors form a throat between which the vines, plants, etc., are received as the harvester moves forward in a field. There are two additional conveyors operating in upright planes which are transverse to the plane occupied by the first mentioned conveyors. All conveyors are equipped with fingers by which to propel the crop into the throat of the harvester at which the lower ends of the plants or vines are cut, causing them to fall onto a conveyor for propelling the cut crop into a windrow.

The windrowed crop is then easily gathered by a combine. However, a number of beans shaken from the vines as they are being conveyed into the windrow, are recovered by a very important feature of the invention. The windrowing conveyor has a table beneath it, and the conveyor is equipped with cleats. These cleats move adjacent to the table and form pushers for the separated beans, depositing them into a receptacle at one end of the table.

Consequently, it is a further object of the invention to provide a bean harvester capable of functioning as aforesaid.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a top view of the harvester unit in FIGURE 1.

FIGURE 4 is a side view of the harvester unit in FIGURE 2.

FIGURE 5 is a diagrammatic perspective view showing a portion of the drive mechanism for one of the harvester units.

Figure 1:
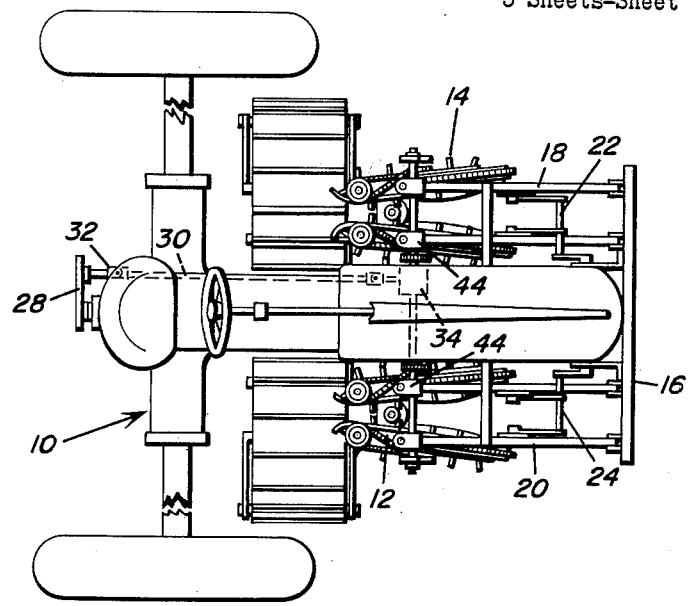
FIGURE 1 is a top view of a tractor equipped with two separate units, one on each side thereof, these units being arranged to service two rows simultaneously.

In the accompanying drawings a conventional tractor 10 is shown as a preferred traction vehicle on which harvesters or harvester units 12 and 14 are mounted. These units are identical in construction and therefore FIGURES 2–5 relate principally to only one of the units. However, before referring explicitly to a typical harvester unit exemplifying the invention, FIGURE 1 further shows one preferred way of mounting the harvester unit on the tractor. Front beam 16 pivotally supports two rearwardly extending frames 18 and 20, and these are capable of being raised and lowered by lift mechanisms operating through lift arms 22 and 24, necessitating pivotal connections between beams 16 and frames 18 and 20. The frame construction for supporting the harvester units is quite arbitrarily selected in that it may be varied considerably without any change whatsoever in the construction and function of the harvester units 12 and 14 which are the subject matter of this invention. Rear power take-off 28 of the tractor is used to power the harvester unit 12 and 14, although it is contemplated that side power take-off provisions on various manufacturers makes of tractors may be used. This would amount merely to adapting the drive of the tractor for actuation of the harvester units 12 and 14. Driveshaft 30 is mechanically connected with a power take-off 28, for example by universal joint 32, and the driveshaft 30 extends forwardly from power take-off 28 to gear box 34 which has a power input shaft 36 coupled to drive shaft 30 by means of a universal joint 38 (FIGURE 5).

Driveshafts 40 and 42 extend laterally outwardly from the gear box 34, and they are supported by bearings 44 attached to frames 18 and 20 respectively. Shafts 40 and 42 extend laterally of the tractor and are located between the front and rear wheels thereof.

Figure 2:
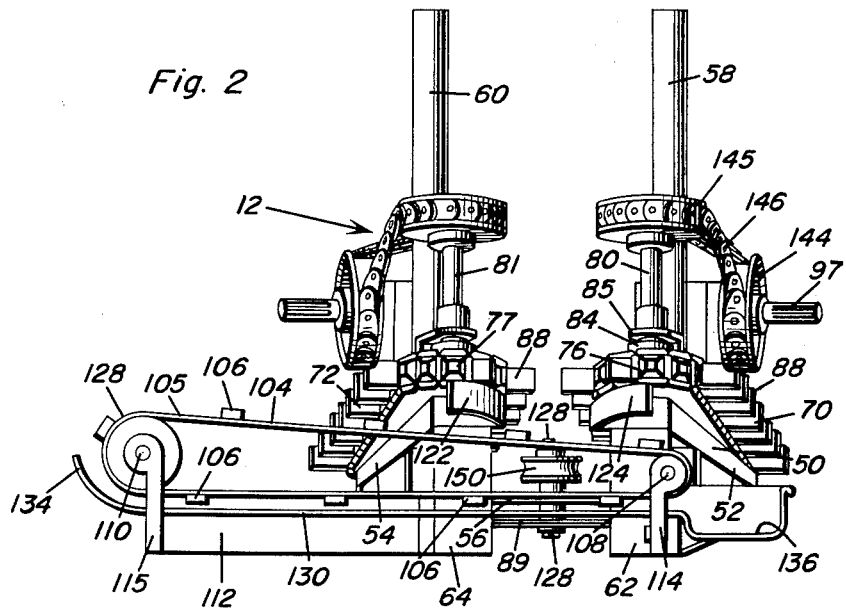
FIGURE 2 is a rear end elevational view of a typical unit, both units being identical in construction.

Reference is now made principally to FIGURES 2–4 showing the construction of the typical harvester or harvester unit 12. It has a frame 50 made in two sections 52 and 54 attached together by a transverse plate 56 near the rear ends of each section. The frame sections each have unit anchor bars 58 and 60 fixed thereto to provide height, toe in and angle adjustments and to support the frame sections 52 and 54 on frames 18 and 20 by being coupled thereto. Conventional couplings are used for this purpose and by vertically sliding the anchor bars 58 and 60 therein, height of adjustment is attained. By moving the anchor bars to the left or right, toe in is acquired, and by tilting bars 58 and 60 with the aid of the conventional coupling and then locking in place, the desired angle is obtained. Elongated ground engaging shoes 62 and 64 are fixed to the frame sections 52 and 54 and are secured at their forward ends to conveyor brackets 66 and 68 with which a number of mechanically moving parts are operatively connected.

There are two conveyors 70 and 72, each conveyor preferably being an endless chain conveyor. These conveyors have sprockets 74, 75, and 76, 77 at the front and rear ends thereof. Sprockets 74 and 75 are mounted for rotation on bearings carried by spindles 78 and 79, and these spindles are supported by conveyor brackets 66 and 68. Sprockets 77 and 76 are mounted to shafts 80 and 81 (FIGURE 2) that are mounted for rotation in bearings, for instance bearings 83 and 84 for shaft 80, carried by the conveyor brackets and an auxiliary bracket 85 fixed to each conveyor bracket 66 and 68. Conveyors 70 and 72 are said to be coplanar, however, the plane is tilted forwardly and downwardly when viewing the conveyors from the side or rear. The lowest point of the pair of conveyors 70 and 72 is at the front of unit 12. When viewed from above conveyors 70 and 72 are spread farther apart at the forward ends thereof than at the rear ends thereof. Each conveyor has a plurality of fingers 88 fixed thereto at spaced intervals in order to propel the crop toward the throat 89 of the harvester unit which is defined as a region of the harvester unit between conveyors 70 and 72 at the point or places where they are closer together.

Each frame section 52 and 54 supports an additional conveyor. There are two additional pickup conveyors 90 and 91 located in upright planes approximately perpendicular to the plane occupied by conveyors 70 and 72. Further, as conveyors 70 and 72, conveyors 90 and 91 are toed out at the front and they converge as they approach the throat 89 of the harvester unit. Here again, the conveyors 90 and 91 are equipped with fingers 93' to aid in propelling the crop toward throat 89 of the harvester unit by initially engaging the crop plants with minimum shock by virtue of their toe-out disposition.

The conveyor 90 is made of an endless chain entrained over front sprocket 93 and rear sprocket 94 and lower sprocket 95 (FIGURE 4) and is properly spaced above the ground by shoe 62. Sprocket 93 is mounted for free turning on a spindle 96 at the forward end of conveyor bracket 66. The sprocket 94 is the drive sprocket, and it is fixed to a drive spindle 97 carried in bearings 98 on conveyor bracket 66. As seen in FIGURE 3, the conveyor bracket 66 has an elongate slot within which conveyor 90 operates. Conveyor 91 is constituted in a manner identical to conveyor 90 also spaced above the ground by shoe 64. It includes a forward sprocket 100, a rear sprocket 101 and a lower sprocket corresponding to sprocket 95. The spindles and shafts are also identical to spindles and shafts 96, 97 and a free turning spindle 99 (FIGURE 5) to which sprocket 95 is connected.

Rear conveyor 104 is made of an endless belt 105 having a number of transverse cleats 106 fixed on the outer surface thereof. Two shafts 108 and 110 at the ends of the endless belt of conveyor 104, support rollers, one of a larger and one of a smaller diameter on which the endless belt 105 is supported. Frame 112 has bearing brackets 114 and 115 fixed thereto, and the shafts 108 and 110 are mounted for rotation in these bearing brackets. Conveyor 104 is a windrowing conveyor for placing the cut vines, plants, etc., in a windrow after they are received from throat 89.

Two shear plates 116 and 118 are attached to frame sections 52 and 54 and they are located in the passageway 120 defined by the two conveyor groups (FIGURE 3). They extend rearwardly and terminate in curved parts 122 and 124 (FIGURE 3) that overlie a part of conveyor 104. A rotary knife 126 is fixed to a vertical spindle 128 carried in bearings supported by plate 56. Rotary knife 126 is approximately horizontally disposed and occupies throat 89 of the harvester unit. Consequently, as the harvester unit moves forward and the vines, plants, etc. are moved through passage 120; severed by knife or blade 126; guided by parts 122 and 124 of the shear plates, they fall upon the endless conveyor or windrowing conveyor 104 and are discharged from the higher end 128 of the conveyor 104 (FIGURE 2) into a windrow.

A lower conveyor table 130 (FIGURE 2) is formed of a plate carried by frame 112 and located below the lower flight or run of conveyor 104. There is an upwardly curved end part 134 of table 130 disposed at the discharge end 128 of conveyor 104. There is also a receptacle 136 at the opposite end of table 130. Transverse cleats 106 move adjacent to the upper surface of table 130 and function as pushers for loose beans that fall from the vines, plants, etc. and are propelled by conveyor 104. These loose beans are not lost by being discharged with the vines into the windrow. Instead they are recovered by being dropped on the table 130 and propelled by conveyor cleats 106 into receptacle 136.

Attention is now invited to FIGURE 5. The drive mechanism for the conveyors of the unit is illustrated diagrammatically. Following power application from shafts 30, 36 and 40, it will be seen that sprockets 101 and 94 are driven in an identical fashion and hence, the sprocket 94 is the only one of this pair that is shown. Sprocket 94 is the drive sprocket for conveyor 90 and it is fixed to shaft 97. Pulley 140 is also fixed to shaft 97, there being splines 141 (FIGURE 3) on shaft 97 to which the pulley 140 is secured, although the pulley is not shown on FIGURES 2-4. Drive belt 142 is engaged over pulley 140 and pulley 143 fixed to shaft 40. This provides motive force for the conveyor 90. The conveyor 70 attains power from shaft 97 through pulleys 144 and 145 together with drive belt 146 engaged over both of these pulleys. Pulley 144 is fixed to shaft 97 while pulley 145 is fixed to shaft 80. In addition, shaft 80 has sprocket 76 fixed thereto in order to complete the drive line for conveyor 70.

Vertical spindle or shaft 128 containing knife 126, has a drive pulley 150 secured to it, and there is a belt 152 engaged with pulley 150 and entrained over pulley 156 on shaft 108. As previously mentioned, shaft 108 constitutes part of conveyor 104. The belt 152 extends over a pulley 158 fixed to shaft 42, and continues on over additional pulleys providing power for the conveyor of harvester unit 14. This completes the drive for the two units.

In use, the units are attached to a traction vehicle such as a tractor, and it is propelled through a field. The plants are gathered by the fingers of the two pairs of harvesting conveyors of each unit and moved to the throat 89 of the harvester unit at which the plants are severed. Then, they are continued to be propelled by fingers 88 of conveyors 70 and 72 until they fall upon conveyor 104. The plants, vines, etc., are then conveyed in a windrow. Meanwhile, the loose beans are gathered by being propelled along table 130 and deposited into receptacle 136. The specific procedure accomplishing this has been described previously.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A crop harvester comprising a frame, a first pair of pickup conveyors carried by said frame and movable in generally upright planes spaced from each other in rearwardly converging relation for initial crop plant engagement, a second pair of conveyors carried by said frame and spaced from each other and movable in a plane transverse to said upright planes, said second conveyors defining a continuously rearwardly converging passageway therebetween within which to receive the crop, stalk cutting means carried by said frame and disposed in said converging passageway adjacent a rear end thereof for severing the crop, a windrowing conveyor carried by said frame and located at said rear end of said passageway and below rear portions of said second conveyors for directly receiving the severed crop and delivering the cut crop in a windrow at a discharge end thereof.

2. The combination of claim 1, including recovery means mounted below said windrowing conveyor for recovering products of the crop which are dropped therefrom prior to being discharged by said windrowing conveyor.

3. The combination of claim 2 wherein said recovery means includes a product collecting table having a receptacle at the end of the table.

4. The subject matter of claim 3 wherein said windrowing conveyor includes a plurality of cleats which serve as pushers as they move over the surface of said table whereby the loose products on the table are pushed into said receptacle.

5. The subject matter of claim 1 wherein said first pair and said second pair of conveyors have fingers protruding therefrom, and shear plates carried by said frame and defining the side walls of said passageway.

6. In a bean harvester, a frame adapted to be mounted on a tractor, a pair of spaced upright conveyors having fingers thereon and movably carried by said frame in rearwardly converging relation to each other, a second pair of spaced conveyors in a plane transverse to said upright planes and having forward portions thereof located below and rearwardly of forward portions of the first mentioned pair of conveyors, said second pairs of conveyor defining a continuous rearward converging passageway therebetween within which to receive the bean crop, severing means carried by said frame and located in said converging passageway toward the rear of said passageway, a windrowing conveyor carried by said frame at the rear end of said passageway below rear portions of said second conveyors to directly receive the severed bean crop and deliver the bean crop to windrow the same.

7. The combination of claim 6 including means mounted on the frame adjacent to said windrowing conveyor for recovering loose beans.

8. The combination of claim 7 wherein said recovering means including a member carried by said frame and located below said windrowing conveyor and defining a space between said windrowing conveyor and said member within which loose beans are collected.

9. The combination of claim 8 including a receptacle at the end of said member into which said loose beans are pushed by the windrowing conveyor.

10. A bean harvester comprising vertically adjustable frame means, a pair of continuously driven crop plant pickup means operatively mounted by said frame means and projecting forwardly therefrom for movement in spaced vertical planes disposed at toe-out angles to each other for initially engaging crop plants therebetween, a pair of horizontally disposed continuously driven crop plant propelling means operatively mounted on the frame means for receiving crop plants from the pickup means and propelling them rearwardly through a continuously converging passage defined by the propelling means, windrowing conveyor means operatively mounted by the frame means transverse to and below rear portions of the propelling means, and stalk cutter means operatively mounted by the frame means forwardly of said windrowing conveyor means, below and between said rear portions of the propelling means.

11. The combination of claim 10, including ground engaging shoe means mounted on the vertically adjustable frame means for spacing said pickup means above the ground and supporting said propelling means at an upward inclination in a rearward direction.

12. The combination of claim 11, wherein said windrowing conveyor means extends laterally beyond said propelling means at one end thereof for discharging cut crop plants therefrom.

13. The combination of claim 12 including loose bean recovery means comprising collector means mounted by the frame means below the windrowing conveyor means for collecting loose beans thereon and pusher means mounted on said conveyor means and cooperating with the collector means for moving the loose means toward an end of the conveyor means opposite said one discharging end, into a receptacle connected to the collector means.

14. The combination of claim 10, wherein said windrowing conveyor means extends laterally beyond said propelling means at one end thereof for discharging cut crop plants therefrom.

15. The combination of claim 14 including loose bean recovery means comprising collector means mounted by the frame means below the windrowing conveyor means for collecting loose beans thereon and pusher means mounted on said conveyor means and cooperating with the collector means for moving the loose means toward an end of the conveyor means opposite said one discharging end, into a receptacle connected to the collector means.

References Cited in the file of this patent
UNITED STATES PATENTS

| | | |
|---|---|---|
| 1,663,843 | Imig | Mar. 27, 1928 |
| 1,815,274 | Ronning et al. | July 21, 1931 |
| 2,550,129 | Urschel | Apr. 24, 1951 |